United States Patent
Li et al.

(10) Patent No.: US 12,542,611 B2
(45) Date of Patent: Feb. 3, 2026

(54) SYSTEM, METHOD, AND COMPUTER PROGRAM PRODUCT FOR A CONFIGURABLE CHANNELIZED BROADBAND LIGHT SOURCE

(71) Applicant: II-VI Delaware, Inc., Wilmington, DE (US)

(72) Inventors: Qingyu Li, Cupertino, CA (US); Oliver Lu, San Jose, CA (US); Haiji J. Yuan, Cupertino, CA (US); Yajun Wang, Naperville, IL (US); Michael J. L. Cahill, Melbourne (AU); Ian Peter Mcclean, Wilmington, DE (US); Glenn D. Bartolini, Lexington, MA (US)

(73) Assignee: II-VI Delaware, Inc., Wilmington, DE (US)

( * ) Notice: Subject to any disclaimer, the term of this patent is extended or adjusted under 35 U.S.C. 154(b) by 145 days.

(21) Appl. No.: 18/221,973

(22) Filed: Jul. 14, 2023

(65) Prior Publication Data
US 2025/0023644 A1    Jan. 16, 2025

(51) Int. Cl.
*H04B 10/572* (2013.01)
*H04B 10/077* (2013.01)
*H04B 10/29* (2013.01)
*H04B 10/564* (2013.01)

(52) U.S. Cl.
CPC ......... *H04B 10/572* (2013.01); *H04B 10/077* (2013.01); *H04B 10/29* (2013.01); *H04B 10/564* (2013.01)

(58) Field of Classification Search
CPC .... H04B 10/572; H04B 10/077; H04B 10/29; H04B 10/564

USPC .......................................................... 398/30
See application file for complete search history.

(56) References Cited

U.S. PATENT DOCUMENTS

| | | | |
|---|---|---|---|
| 9,632,391 B2* | 4/2017 | Wagener | G02F 1/31 |
| 12,231,832 B2* | 2/2025 | Fennema | H04Q 11/0003 |
| 2013/0129348 A1* | 5/2013 | Mak | H04B 10/548 398/26 |
| 2020/0153502 A1 | 5/2020 | Buset et al. | |
| 2020/0304204 A1 | 9/2020 | Syed et al. | |
| 2020/0336238 A1 | 10/2020 | St-Laurent et al. | |
| 2022/0334416 A1* | 10/2022 | Jiang | G02F 1/0136 |
| 2024/0162675 A1* | 5/2024 | McClean | H01S 3/094042 |
| 2025/0023644 A1* | 1/2025 | Li | H04B 10/29 |

FOREIGN PATENT DOCUMENTS

| | | | | |
|---|---|---|---|---|
| CN | 105784328 A | * | 7/2016 | G01M 11/335 |
| CN | 110333193 A | * | 10/2019 | G01N 21/274 |

* cited by examiner

Primary Examiner — Amritbir K Sandhu
(74) Attorney, Agent, or Firm — The Webb Law Firm

(57) ABSTRACT

Systems may include a broadband light source device, which may include at least one processor programmed or configured to receive an electrical control signal for operating a component of a plurality of components of a spectrum control device of the broadband light source device, determine which component of the plurality of components of the spectrum control device to operate based on the electrical control signal, and operate a first component of the plurality of components of the spectrum control device based on determining to operate the first component. Methods and computer program products are also disclosed.

14 Claims, 10 Drawing Sheets

SYSTEM, METHOD, AND COMPUTER PROGRAM PRODUCT FOR A CONFIGURABLE CHANNELIZED BROADBAND LIGHT SOURCE

BACKGROUND

1. Field

This disclosed subject matter relates generally to fiber-optic communication and, in some non-limiting embodiments, to systems, methods, and computer program products for a configurable, channelized, broadband light source that may be used during recovery of transport system faults in optical communications networks.

2. Technical Considerations

Optical communication (e.g., optical telecommunication) may refer to a method of communication between two locations at a distance apart using light to carry information. An optical communication system may use a transmitter, which encodes a message into an optical signal, a channel, which carries the optical signal to its destination, and a receiver, which reproduces the message from the optical signal that is received by the receiver.

Fiber-optic communication may refer to a form of optical communication that involves transmitting information from one place to another by sending pulses of light (e.g., infrared light) through an optical fiber. The light may be used as a form of carrier wave that is modulated to carry the information. Optical fiber may be preferred over electrical cabling in specific situations, such as when high bandwidth, long distance, and/or immunity to electromagnetic interference is required. Fiber-optic communication can transmit voice, video, and telemetry through local area networks or across long distances.

SUMMARY

Accordingly, it is an object of the presently disclosed subject matter to provide systems, devices, products, and/or methods that overcome some or all of the deficiencies of the prior art.

According to non-limiting embodiments, provided is a broadband light source device, which may include at least one processor programmed or configured to: receive an electrical control signal for operating a component of a plurality of components of a spectrum control device of the broadband light source device, determine which component of the plurality of components of the spectrum control device to operate based on the electrical control signal, and operate a first component of the plurality of components of the spectrum control device based on determining to operate the first component.

According to non-limiting embodiments, provided is a method for operating a broadband light source device, which may include receiving, with at least one processor, an electrical control signal for operating a component of a plurality of components of a spectrum control device of the broadband light source device, determining, with at least one processor, which component of the plurality of components of the spectrum control device to operate based on the electrical control signal, and operating, with at least one processor, a first component of the plurality of components of the spectrum control device based on determining to operate the first component.

According to non-limiting embodiments, provided is a computer program product for operating a broadband light source device, which may include at least one non-transitory computer-readable medium including one or more instructions that, when executed by at least one processor, cause the at least one processor to receive an electrical control signal for operating a component of a plurality of components of a spectrum control device of the broadband light source device, determine which component of the plurality of components of the spectrum control device to operate based on the electrical control signal, and operate a first component of the plurality of components of the spectrum control device based on determining to operate the first component.

Further embodiments are set forth in the following numbered clauses:

Clause 1: A broadband light source device, comprising: at least one processor programmed or configured to: receive an electrical control signal for operating a component of a plurality of components of a spectrum control device of the broadband light source device; determine which component of the plurality of components of the spectrum control device to operate based on the electrical control signal; and operate a first component of the plurality of components of the spectrum control device based on determining to operate the first component.

Clause 2: The broadband light source device of clause 1, wherein the spectrum control device comprises: a liquid crystal device, a microelectromechanical systems (MEMS) device, a digital light processing (DLP) device, a liquid crystal on silicon (LCoS) device, or any combination thereof.

Clause 3: The broadband light source device of clause 1 or 2, further comprising: a host controller; and a laser light source; and wherein the at least one processor is further programmed or configured to: activate the laser light source based on a signal from the host controller.

Clause 4: The broadband light source device of any of clauses 1-3, wherein each component of the plurality of components of the spectrum control device comprises a liquid crystal pixel of a liquid crystal device, and wherein, when operating the first component of the plurality of components of the spectrum control device, the at least one processor is programmed or configured to: control a voltage applied to a first liquid crystal pixel within 5 ms of receiving the electrical control signal.

Clause 5: The broadband light source device of any of clauses 1-4, wherein, when controlling the voltage applied to a first liquid crystal pixel within 5 ms of receiving the electrical control signal, the at least one processor is programmed or configured to: control the voltage applied to a first liquid crystal pixel to cause the first liquid crystal pixel to reflect a first range of wavelengths of light within 5 ms of receiving the electrical control signal.

Clause 6: The broadband light source device of any of clauses 1-5, wherein, when determining which component of the plurality of components of the spectrum control device to operate, the at least one processor is programmed or configured to: determine a first range of wavelengths of light based on data included in the electrical control signal; and determine that a first component, which corresponds to the first range of wavelengths of light, of the plurality of components of the spectrum control device is to be operated.

Clause 7: The broadband light source device of any of clauses 1-6, wherein, when receiving the electrical control signal for operating a component of the plurality of components of the spectrum control device, the at least one processor is programmed or configured to: receive the electrical control signal based on a presence of a reduction of power in an optical transmission band of a plurality of optical transmission bands of an optical communications network.

Clause 8: A method for operating a broadband light source device, comprising: receiving, with at least one processor, an electrical control signal for operating a component of a plurality of components of a spectrum control device of the broadband light source device; determining, with at least one processor, which component of the plurality of components of the spectrum control device to operate based on the electrical control signal; and operating, with at least one processor, a first component of the plurality of components of the spectrum control device based on determining to operate the first component.

Clause 9: The method of clause 8, further comprising: activating a laser light source based on signal from a host controller.

Clause 10: The method of clause 8 or 9, wherein each component of the plurality of components of the spectrum control device comprises a liquid crystal pixel of a liquid crystal device, and wherein operating the first component of the plurality of components of the spectrum control device comprises: controlling a voltage applied to a first liquid crystal pixel within 5 ms of receiving the electrical control signal.

Clause 11: The method of any of clauses 8-10, wherein controlling the voltage applied to a first liquid crystal pixel within 5 ms of receiving the electrical control signal comprises: controlling the voltage applied to a first liquid crystal pixel to cause the first liquid crystal pixel to reflect a first range of wavelengths of light within 5 ms of receiving the electrical control signal.

Clause 12: The method of any of clauses 8-11, wherein determining which component of the plurality of components of the spectrum control device to operate comprises: determining a first range of wavelengths of light based on data included in the electrical control signal; and determining that a first component, which corresponds to the first range of wavelengths of light, of the plurality of components of the spectrum control device is to be operated.

Clause 13: The method of any of clauses 8-12, wherein receiving the electrical control signal for operating a component of the plurality of components of the spectrum control device comprises: receiving the electrical control signal based on a presence of a reduction of power in an optical transmission band of a plurality of optical transmission bands of an optical communications network.

Clause 14: The method of any of clauses 8-13, wherein receiving the electrical control signal comprises: receiving the electrical control signal based on an instruction received from an optical channel monitor (OCM) to operate a broadband light source device.

Clause 15: A computer program product for operating a broadband light source device comprising at least one non-transitory computer-readable medium including one or more instructions that, when executed by at least one processor, cause the at least one processor to: receive an electrical control signal for operating a component of a plurality of components of a spectrum control device of the broadband light source device; determine which component of the plurality of components of the spectrum control device to operate based on the electrical control signal; and operate a first component of the plurality of components of the spectrum control device based on determining to operate the first component.

Clause 16: The computer program product of clause 15, wherein each component of the plurality of components of the spectrum control device comprises a liquid crystal pixel of a liquid crystal device, and wherein, the one or more instructions that cause the at least one processor to operate the first component of the plurality of components of the spectrum control device, cause the at least one processor to: control a voltage applied to a first liquid crystal pixel within 5 ms of receiving the electrical control signal.

Clause 17: The computer program product of clause 15 or 16, wherein the one or more instructions that cause the at least one processor to control the voltage applied to the first liquid crystal pixel within 5 ms of receiving the electrical control signal, cause the at least one processor to: control the voltage applied to a first liquid crystal pixel to cause the first liquid crystal pixel to reflect a first range of wavelengths of light within 5 ms of receiving the electrical control signal.

Clause 18: The computer program product of any of clauses 15-17, wherein the one or more instructions further cause the at least one processor to: activate a laser light source.

Clause 19: The computer program product of any of clauses 15-18, wherein, the one or more instructions that cause the at least one processor to determine which component of the plurality of components of the spectrum control device to operate, cause the at least one processor to: determine a first range of wavelengths of light based on data included in the electrical control signal; and determine that a first component, which corresponds to the first range of wavelengths of light, of the plurality of components of the spectrum control device is to be operated.

Clause 20: The computer program product of any of clauses 15-19, wherein, the one or more instructions that cause the at least one processor to receive the electrical control signal for operating a component of the plurality of components of the spectrum control device, cause the at least one processor to: receive the electrical control signal based on a presence of a reduction of power in an optical transmission band of a plurality of optical transmission bands of an optical communications network.

These and other features and characteristics of the presently disclosed subject matter, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosed subject matter. As used in the specification and the claims, the singular forms of "a," "an," and "the" include plural referents unless the context clearly dictates otherwise.

BRIEF DESCRIPTION OF THE DRAWINGS

Additional advantages and details of the disclosed subject matter are explained in greater detail below with reference to the exemplary embodiments that are illustrated in the accompanying figures, in which.

DESCRIPTION

Figure 1:
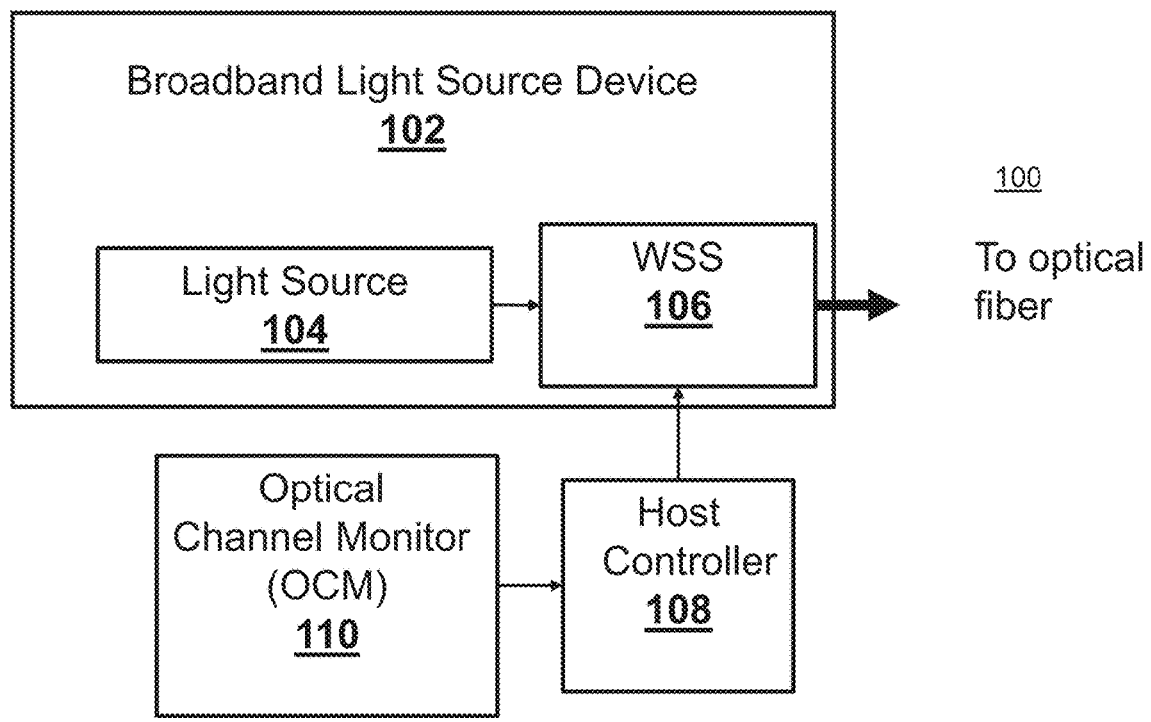
FIG. 1 is a diagram of a non-limiting embodiment of an environment in which systems, devices, products, and/or methods, described herein, may be implemented according to the presently disclosed subject matter.

For purposes of the description hereinafter, the terms "end," "upper," "lower," "right," "left," "vertical," "horizontal," "top," "bottom," "lateral," "longitudinal," and derivatives thereof shall relate to the disclosed subject matter as it is oriented in the drawing figures. However, it is to be understood that the disclosed subject matter may assume various alternative variations and step sequences, except where expressly specified to the contrary. It is also to be understood that the specific devices and processes illustrated in the attached drawings, and described in the following specification, are simply exemplary embodiments of the disclosed subject matter. Hence, specific dimensions and other physical characteristics related to the embodiments disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

Some non-limiting embodiments are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

In some instances, fiber optic communication may involve the use of dense wavelength-division multiplexing (DWDM), which is an optical fiber multiplexing technology that is used to increase the bandwidth of existing fiber optic communication networks. DWDM may combine data signals (e.g., signals carrying information) from different sources over a single pair of optical fiber, while maintaining complete separation of the data signals. DWDM may involve the use of C-band and L-band signals.

When C-band and L-band signals propagate along a single optical fiber, signals from the C-band and L-band interact with each other that change the power of the signals. In some instances, stimulated Raman scattering (SRS) in optical fiber may transfer energy from higher to lower frequencies, such as from the C-band to the L-band, and the magnitude of the energy that is transferred may depend on a strength of the signals and a separation between the signals.

A solution to SRS may involve amplification of signals from the C-band and the L-band. In some instances, a design for amplification may use separate gain blocks (e.g., separate erbium-doped fiber amplifier (EDFA) gain blocks), there may be a possibility of outages in one band (e.g. a failure caused by an amplifier and/or electrical failure) causing issues in the other band due to effects associated with changing SRS. However, issues caused on both bands may be highly undesirable when only one band experiences an outage, accordingly an effect on a band not experiencing an outage is preferred to be short and limited.

Non-limiting embodiments of the disclosed subject matter are directed to a broadband light source device and may include at least one processor programmed or configured to receive an electrical control signal for operating a component of a plurality of components of a spectrum control device of the broadband light source device, determine which component of the plurality of components of the spectrum control device to operate based on the electrical control signal, and operate a first component of the plurality of components of the spectrum control device based on determining to operate the first component. In some non-limiting embodiments, the spectrum control device may include a liquid crystal device, a microelectromechanical systems (MEMS) device, a digital light processing (DLP) device, a liquid crystal on silicon (LCoS) device, or any combination thereof. In some non-limiting embodiments, the broadband light source device may include a host controller and a laser light source, and the at least one processor may be further programmed or configured to activate the laser light source based on a signal from the host controller.

In some non-limiting embodiments, each component of the plurality of components of the spectrum control device may include a liquid crystal pixel of a liquid crystal device, and when operating the first component of the plurality of components of the spectrum control device, the at least one processor may be programmed or configured to control a voltage applied to a first liquid crystal pixel within 5 ms of receiving the electrical control signal. In some non-limiting embodiments, when controlling the voltage applied to a first liquid crystal pixel within 5 ms of receiving the electrical control signal, the at least one processor may be programmed or configured to control the voltage applied to a first liquid crystal pixel to cause the first liquid crystal pixel to reflect a first range of wavelengths of light within 5 ms of receiving the electrical control signal.

In some non-limiting embodiments, when determining which component of the plurality of components of the spectrum control device to operate, the at least one processor may be programmed or configured to determine a first range of wavelengths of light based on data included in the electrical control signal, and determine that a first component, which corresponds to the first range of wavelengths of light, of the plurality of components of the spectrum control device is to be operated. In some non-limiting embodiments, when receiving the electrical control signal for operating a component of the plurality of components of the spectrum control device, the at least one processor may be programmed or configured to receive the electrical control signal based on a presence of a reduction of power in an optical transmission band of a plurality of optical transmission bands of an optical communications network.

In this way, the broadband light source device may provide a stand-alone, channelized source for C+L band signal spectrum control with approximately 5 ms or less in optical response time. Further, an output spectrum can be fully-off, fully-on or any profiles in between for different application scenarios. Additionally, an output extinction ratio may be better than 35 dB so that a requirement on port isolation on a port involved may be greatly relaxed.

Referring now to FIG. 1, FIG. 1 is a diagram of an example environment 100 in which systems, devices, products, and/or methods, described herein, may be implemented. As shown in FIG. 1, environment 100 may include broadband light source device 102, which includes light source 104, wavelength selective switch (WSS) 106, host controller 108, and optical channel monitor (OCM) 110. In some non-limiting embodiments, broadband light source device 102, host controller 108, and optical channel monitor (OCM) 110 may interconnect (e.g., establish a connection to communicate) via wired connections, wireless connections, or a combination of wired and wireless connections.

Broadband light source device 102 may include one or more devices configured to communicate with host controller 108, and/or OCM 110, and to control operation of a light source (e.g., a laser). For example, broadband light source device 102 may include a circuit, a controller, a processing device, a computing device, (e.g., a server, a group of servers, etc.) and/or other like devices. Additionally or alternatively, broadband light source device 102 may be a component of an optical communications network and/or may be in communication with a system for recovery of transport system faults in optical communications networks. In some non-limiting embodiments, broadband light source device 102 may be in communication with a data storage device, which may be local or remote to broadband light source device 102. In some non-limiting embodiments, broadband light source device 102 may be capable of receiving information from, storing information in, transmitting information to, and/or searching information stored in the data storage device. In some non-limiting embodiments, broadband light source device 102 may be capable of providing an output that includes a spectrum of light in a C-band (e.g., electromagnetic spectrum in a range of wavelengths between 1530 nm to 1565 nm) and/or an L-band (e.g., electromagnetic spectrum in a range of wavelengths between 1570 nm to 1610 nm). In some non-limiting embodiments, broadband light source device 102 may be capable of providing an output that includes a spectrum of light in an optical transmission band that does not include the C-band or L-band or an optical transmission band other than the C-band or L-band. In some non-limiting embodiments, broadband light source device 102 may include the ability to select a specific spectrum among a plurality of spectra.

In some non-limiting embodiments, broadband light source device 102 may include light source 104 and WSS 106. In some non-limiting embodiments, light source 104 may include a light source (e.g., a laser light source, such as a laser, a pump laser, a broadband light source, an amplified spontaneous emission (ASE) light source, etc.) that is capable of producing light at a wavelength and/or in a range of wavelengths that correspond to one or more optical transmission bands of an optical communications network. In some non-limiting embodiments, WSS 106 may include a wavelength selective switch (WSS) device that is capable of routing (e.g., switching) signals to an optical fiber in an optical communications network on the basis of a wavelength or a range of wavelengths. In some non-limiting embodiments, WSS 106 may include components, such as an optical grating and/or a spectrum control device, that allow WSS 106 to selectively route a signal based on desired wavelength or range of wavelengths of the signal independent of signals outside of the desired wavelength or range of wavelengths.

In some non-limiting embodiments, WSS 106 may include a spectrum control device that includes a liquid crystal device, a microelectromechanical systems (MEMS) device, a digital light processing (DLP) device, a liquid crystal on silicon (LCoS) device, or any combination thereof. In some non-limiting embodiments, WSS 106 may include a controller, and the controller may include an application specific integrated circuit (ASIC) that allows for control voltages that are to be applied to one or more components of a spectrum control device, such as liquid crystal pixels, within 1 ms. In some non-limiting embodiments, a response time of the one or more components of a spectrum control device may be less than 3 ms. In some non-limiting embodiments, an overall response time of broadband light source device 102 may be less than 5.5 ms. In one example, the overall response time of broadband light source device 102 may be less than 5 ms.

In some non-limiting embodiments, broadband light source device 102 may have a plurality of output spectrum states. For example, broadband light source device 102 may have a fully-blocked output spectrum state, fully-on output spectrum state, or a profile in between a fully-blocked output spectrum state and a fully-on output spectrum state (e.g., a band output spectrum states) as appropriate based on an application scenario. In some non-limiting embodiments, an output extinction ratio of broadband light source device 102 may be greater than 35 dB, and in this way a requirement on port isolation of WSS 106 on a port involved in transmitting light from light source 104 may be relaxed as compared to a broadband light source (e.g., an amplified spontaneous emission (ASE) light source) that does not have a high output extinction ratio.

Host controller 108 may include one or more devices configured to communicate with broadband light source device 102, and/or OCM 110. For example, host controller 108 may include a circuit, a controller, a processing device, a computing device, (e.g., a server, a group of servers, etc.) and/or other like devices. In some non-limiting embodiments, host controller 108 may be configured to communicate according to an RS232 communication protocol. In some non-limiting embodiments, host controller 108 may be capable of transmitting a signal (e.g., a command signal, such as an electrical control signal) to broadband light source device 102 (e.g., WSS 106 of broadband light source device 102) in less than 1.5 ms. In some non-limiting embodiments, host controller 108 may be capable of transmitting a signal on one or more of 96 channels. In some non-limiting embodiments, host controller 108 may be a component of broadband light source device 102.

OCM 110 may include one or more devices configured to communicate with broadband light source device 102, and/or host controller 108. For example, OCM 110 may include a circuit, a controller, a processing device, a computing device, (e.g., a server, a group of servers, etc.) and/or other like devices. In some non-limiting embodiments, OCM 110 may include an optical channel monitor (OCM) device (e.g., a fast OCM, an OCM sensing device, etc.) and/or other components of an optical communications network.

Figure 2:
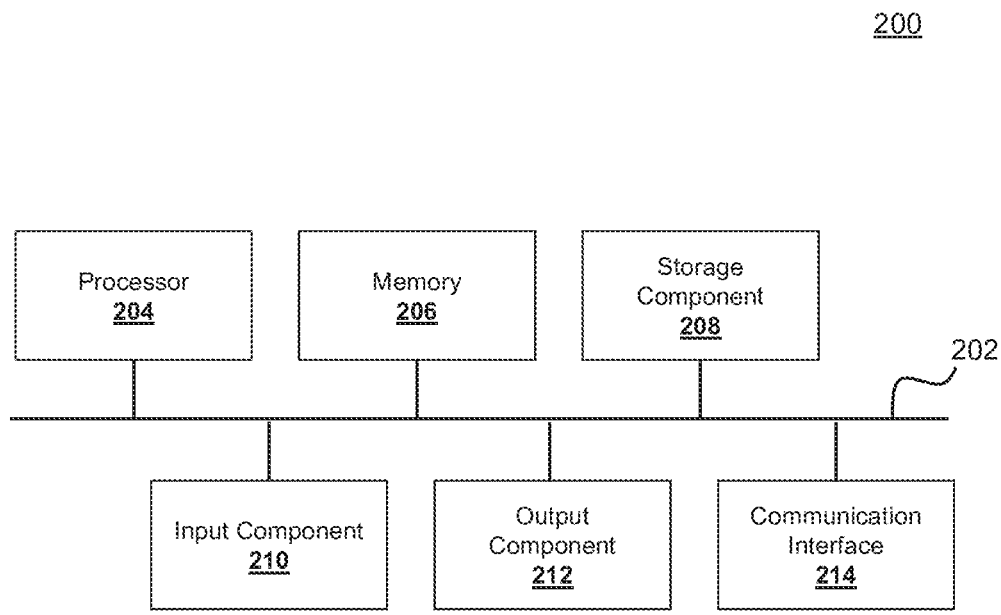
FIG. 2 is a diagram of a non-limiting embodiment of components of one or more devices of FIG. 1.

Referring now to FIG. 2, FIG. 2 is a diagram of example components of a device 200. Device 200 may correspond to broadband light source device 102 (e.g., one or more components of broadband light source device 102, such as light source 104 and/or WSS 106), host controller 108 and/or OCM 110. In some non-limiting embodiments, broadband light source device 102, host controller 108 and/or OCM 110 may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments, processor 204 may be implemented in hardware, software, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), a device configured to implement logic functions, etc.) that can be programmed to perform a function. Memory 206 may include random access memory (RAM), read-only memory (ROM), and/or another type of dynamic or static storage memory (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, etc.). Additionally or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments described herein are not limited to any specific combination of hardware circuitry and software.

The number and arrangement of components shown in FIG. 2 are provided as an example. In some non-limiting embodiments, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
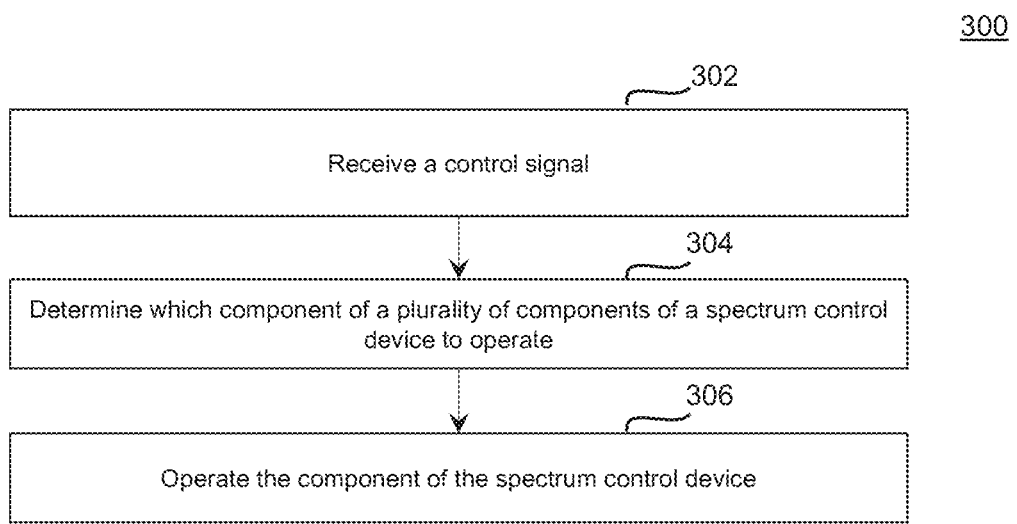
FIG. 3 is a flowchart of a non-limiting embodiment of a process for operating a broadband light source device according to the presently disclosed subject matter.

Referring now to FIG. 3, FIG. 3 is a flowchart of a non-limiting embodiment of a process 300 for operating a broadband light source device, such as an ASE light source. In some non-limiting embodiments, one or more of the steps of process 300 may be performed (e.g., completely, partially, etc.) by broadband light source device 102 (e.g., one or more devices of broadband light source device 102, such as light source 104 and/or WSS 106). In some non-limiting embodiments, one or more of the steps of process 300 may be performed (e.g., completely, partially, etc.) by another device or a group of devices separate from or including broadband light source device 102, such as host controller 108 and/or OCM 110.

As shown in FIG. 3, at step 302, process 300 includes receiving a control signal. For example, broadband light source device 102 may receive a control signal (e.g., an electrical control signal) from host controller 108. In some non-limiting embodiments, the control signal may be a signal for operating a component of a plurality of components of a spectrum control device of broadband light source device 102 (e.g., a spectrum control device of WSS 106 of broadband light source device 102). In some non-limiting embodiments, the control signal may include data associated with an optical transmission band of an optical communications network that corresponds to a component of a plurality of components of a spectrum control device. In some non-limiting embodiments, the optical transmission band may be a C-band (e.g., electromagnetic spectrum in a range of wavelengths between 1530 nm to 1565 nm) or an L-band (e.g., electromagnetic spectrum in a range of wavelengths between 1570 nm to 1610 nm). In some non-limiting embodiments, the optical transmission band may be a band that does not include the C-band or L-band. In some non-limiting embodiments, the optical transmission band may be any band that is used for optical communications. In some non-limiting embodiments, each component of the plurality of components of the spectrum control device may correspond to an optical transmission band of an optical communications network.

In some non-limiting embodiments, OCM 110 may identify the presence of a reduction of power in an optical transmission band (e.g., based on a total loss of power in the optical transmission band, based on a partial loss of power in the optical transmission band, etc.) and OCM 110 may transmit an electrical signal to host controller 108. In some non-limiting embodiments, host controller 108 may determine the optical transmission band based on the electrical signal received from OCM 110 and host controller 108 may generate the electrical control signal to transmit to broadband light source device 102. In some non-limiting embodiments, the electrical control signal may include data associated with an optical transmission band (e.g., identification data associated with an optical transmission band, such an identification of a C-band, an L-band, etc.) that is experiencing a reduction of power.

As shown in FIG. 3, at step 304, process 300 includes determining which component of a plurality of components of a spectrum control device to operate. For example, broadband light source device 102 may determine which component of a plurality of components of a spectrum control device to operate. In some non-limiting embodiments, broadband light source device 102 may determine which component of the spectrum control device to operate based on the electrical control signal received from host controller 108. In some non-limiting embodiments, broadband light source device 102 may determine a first range of wavelengths of light (e.g., a C-band, an L-band, etc.) based on data included in the electrical control signal and broadband light source device 102 may determine that a first component, which corresponds to the first range of wavelengths of light, of the plurality of components of the spectrum control device is to be operated.

As shown in FIG. 3, at step 306, process 300 includes operating the component of the spectrum control device. For example, broadband light source device 102 may operate (e.g., drive, control, activate, etc.) the component of the spectrum control device that was determined to be operated based on the control signal. In some non-limiting embodiments, the optical communications light source may include a broadband light source.

In some non-limiting embodiments, broadband light source device 102 may operate on one or more components (e.g., a single component, a plurality of components, a plurality of components simultaneously, etc.) of the plurality of components of the spectrum control device based on determining to operate the first component. In some non-limiting embodiments, the one or more components may correspond to data associated with one or more optical transmission bands that was included in an electrical control signal received from host controller 108.

In some non-limiting embodiments, broadband light source device 102 may emit light in one or more optical transmission bands as an output. For example, broadband light source device 102 may emit light in one or more optical transmission bands as an output within 5.5 ms, (e.g., within 5 ms, 4.5 ms, etc.).

In some non-limiting embodiments, broadband light source device 102 may operate the one or more components to reflect light (e.g., to allow the light to be emitted by broadband light source device 102 as an output) in one or more optical transmission bands or block light (e.g., to prevent the light to be emitted by broadband light source device 102 as an output) in one or more optical transmission bands. For example, where each component of the plurality of components of the spectrum control device includes a liquid crystal pixel of a liquid crystal device, when operating a component of the spectrum control device, broadband light source device 102 may control a voltage applied to a liquid crystal pixel of the liquid crystal device. In some non-limiting embodiments, broadband light source device 102 may control the voltage applied to the liquid crystal pixel to cause the liquid crystal pixel to reflect light (e.g., to reflect light to an output optical fiber of broadband light source device 102) or control the voltage applied to the liquid crystal pixel to cause the liquid crystal pixel to block the light (e.g., to prevent, stop, etc., light from being reflected to an output optical fiber of broadband light source device 102, such as by absorption). In some non-limiting embodiments, broadband light source device 102 may control the voltage applied to the liquid crystal pixel within a time period (e.g., 5 ms) of receiving the electrical control signal from host controller 108.

In some non-limiting embodiments, broadband light source device 102 may activate light source 104 to provide light (e.g., in a specific optical transmission band) as an output. For example, broadband light source device 102 may activate light source 104 based on a signal from host controller 108. In some non-limiting embodiments, light source 104 may be in a fully-on state, such that a signal is not required to activate light source 104.

Figure 4:
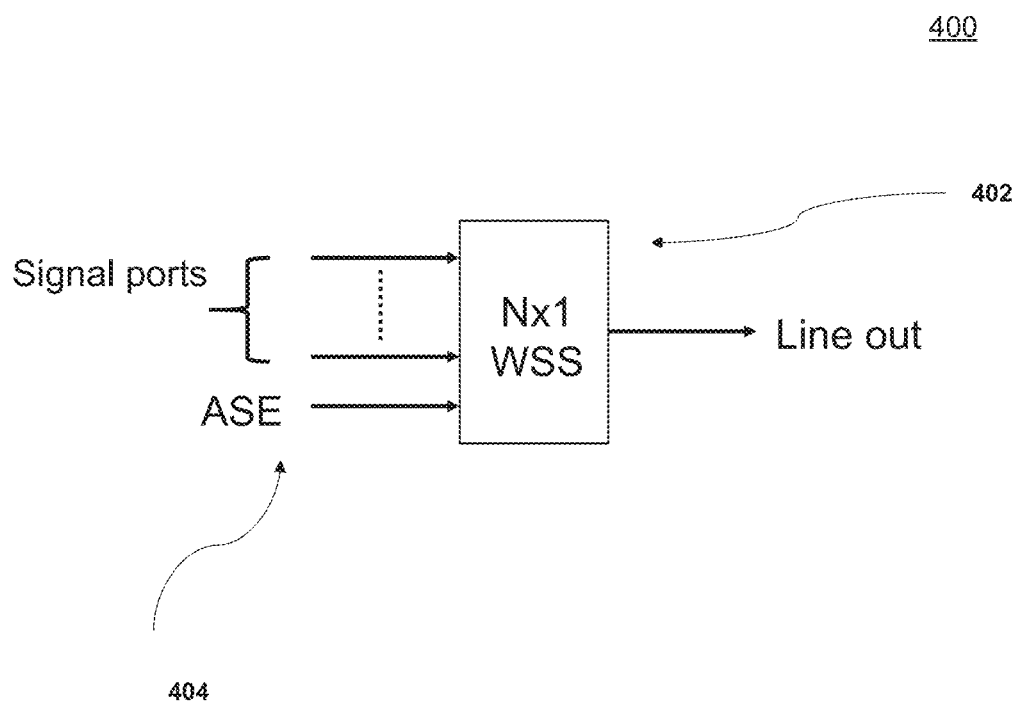
FIG. 4 is a diagram of a non-limiting embodiment of a broadband light source connected to a wavelength selective switch (WSS)

Referring now to FIG. 4, FIG. 4 is a diagram of a non-limiting embodiment of ASE light source 404 connected to wavelength selective switch (WSS) 402. As shown in FIG. 4, WSS 402 includes a plurality of signal ports as inputs to WSS 402 and a line out as an output to WSS 402. As further shown in FIG. 4, ASE light source 404 may be connected to a signal port of WSS 402 as an input. In some non-limiting embodiments, in the event of a failure of one or more inputs of WSS 402, WSS 402 may provide light received from ASE light source 404 as an output of WSS 402. In some non-limiting embodiments, ASE light source 404 may be the same as or similar to broadband light source device 102.

In some non-limiting embodiments, ASE light source 404 may insert light on an input based on an OCM (e.g., a C-band OCM or an L-band OCM) that performs a scan operation (e.g., at 2 scans/sec) with either a line card or node control loop that function at a time interval of 10 seconds or longer based on a power balancing algorithm. In some non-limiting embodiments, ASE light source 404 may insert light on an input and WSS 402 may provide the light to a line out of WSS 402 in less than 1 second.

Figure 5:
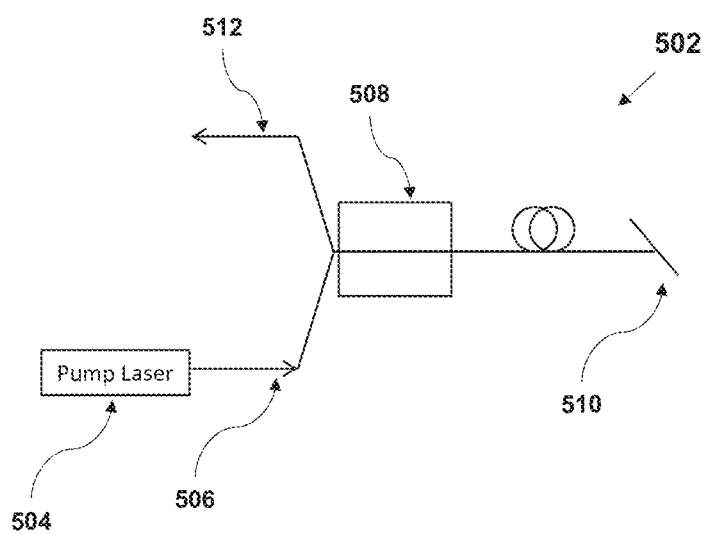
FIG. 5 is a diagram of a non-limiting embodiment of a broadband light source device according to the presently disclosed subject matter.

Referring now to FIG. 5, FIG. 5 a diagram of a non-limiting embodiment of broadband light source device 502. In some non-limiting embodiments, broadband light source device 502 may be the same as or similar to broadband light source device 102. In some non-limiting embodiments, broadband light source device 502 may include a light source that provides a full spectrum. As shown in FIG. 5, broadband light source device 502 may include pump laser 504 (e.g., as a light source), input optical fiber 506, input light beam shaping component 508, reflective mirror 510, and output optical fiber 512.

In some non-limiting embodiments, pump laser 504 may provide a beam of light that is transmitted along input optical fiber 506 to input light beam shaping component 508. In some non-limiting embodiments, input light beam shaping component 508 may include a Wavelength Division Multiplexing (WDM) coupler that combines and/or separates a signal wavelength and/or a pump wavelength. An output of input light beam shaping component 508 is provided to reflective mirror 510 and one or more specified spectra of light (e.g., which correspond to one or more specified optical transmission bands, such as a C-band and/or an L-band) may be provided (e.g., by a spectrum control device) along output optical fiber 506 as an output of broadband light source device 502. In some non-limiting embodiments, input optical fiber and/or output optical fiber 512 may include an erbium doped optical fiber. In some non-limiting embodiments, pump laser 504 may be the same as or similar to light source 104.

Figure 6:
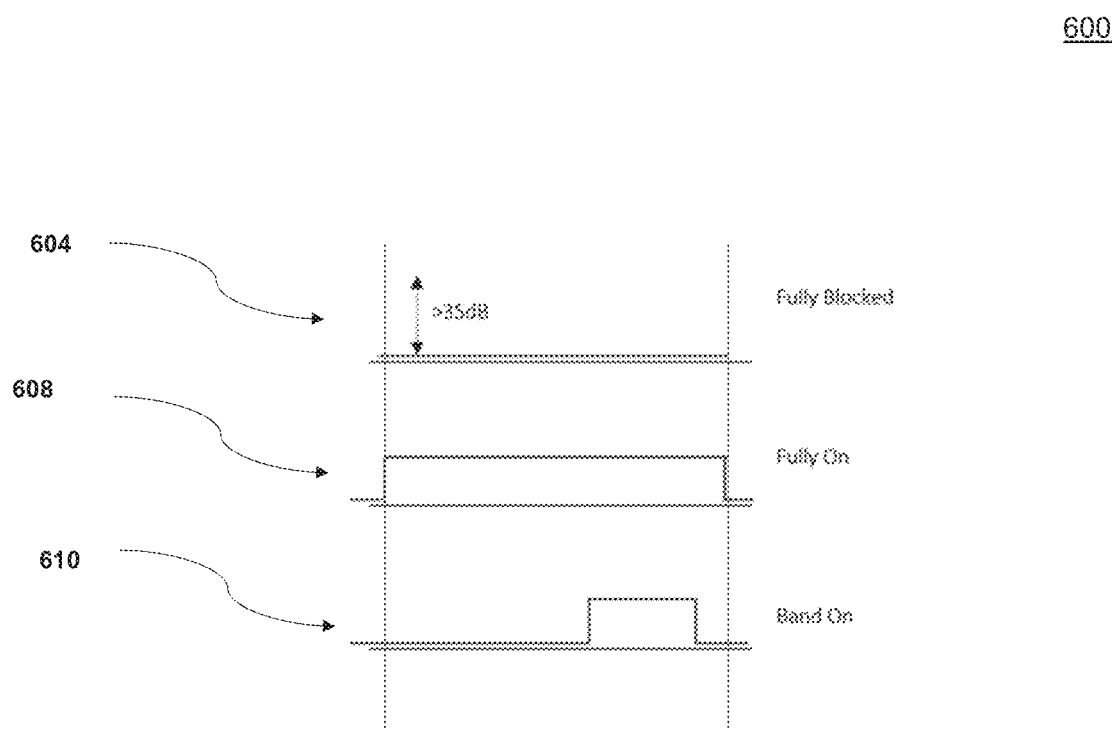
FIG. 6 is table of outputs provided based on a plurality of states of a broadband light source device according to the presently disclosed subject matter.

Referring now to FIG. 6, FIG. 6 is a table of output spectra provided based on a plurality of output spectrum states of a non-limiting embodiment of a broadband light source device (e.g., broadband light source device 102, ASE light source 404, broadband light source device 502, etc.). As shown in FIG. 6, the broadband light source device may have a plurality of output spectrum states 604, 608, and 610. As further shown in FIG. 6, fully blocked output spectrum state 604 may include a signal profile that is reduced 35 dB or more from an input (e.g., an input optical signal provided by pump laser 504, an input optical signal provided by broadband light source device 502). As further shown in FIG. 6, fully-on output spectrum state may include a signal profile with a width of spectrum to be output that corresponds to a full width of spectrum capable of being output by the broadband light source device at a desired magnitude. As further shown in FIG. 6, band-on output spectrum state may include a signal profile with a reduced width of spectrum to be output as compared to the full width of spectrum capable of being output by the broadband light source device at a desired magnitude. In some non-limiting embodiments, the reduced width of spectrum may be a specific band of spectrum, such as a specific optical transmission band.

Figure 7:
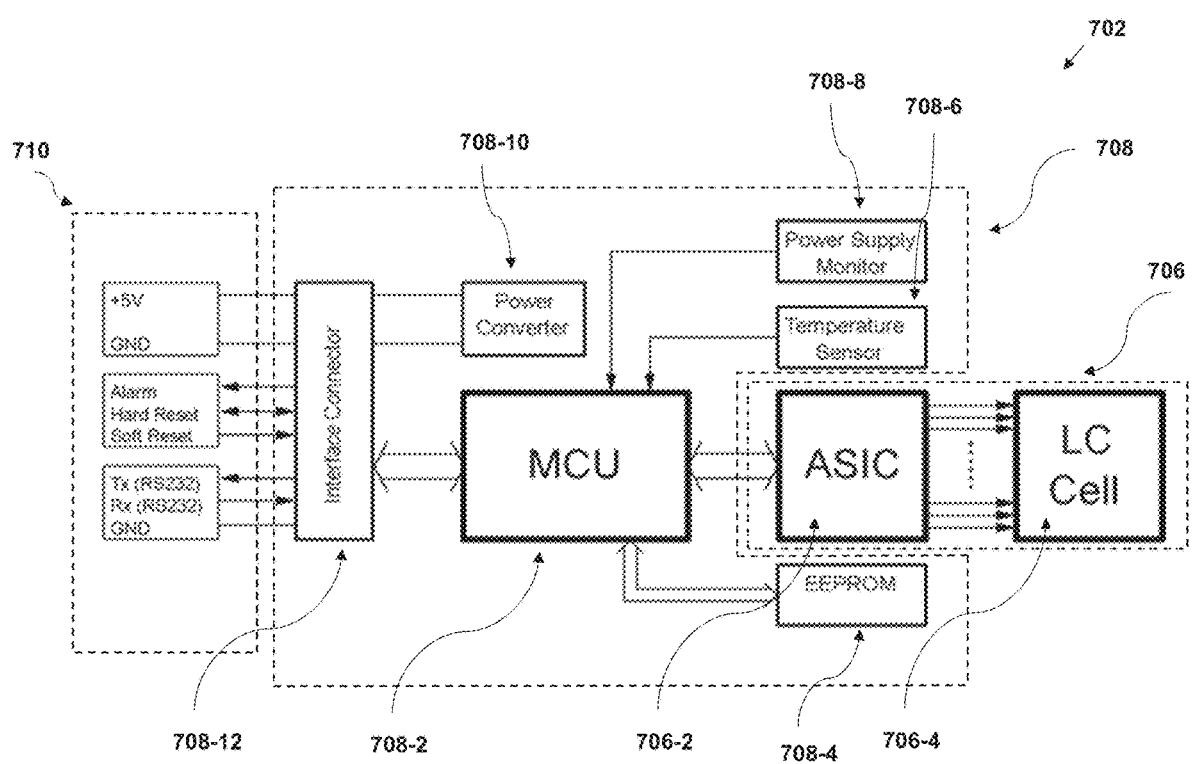
FIG. 7 is a non-limiting embodiment of a control schematic of a broadband light source device according to the presently disclosed subject matter.

Referring now to FIG. 7, FIG. 7 is a diagram of control components schematic of a non-limiting embodiment of broadband light source device 702 (e.g., control electronics for WSS 706, or control electronics for spectrum selection/configuration device). In some non-limiting embodiments, broadband light source device 702 may be the same as or similar to broadband light source device 102, ASE light source 404, and/or broadband light source device 502. As shown in FIG. 7, broadband light source device 702 may include WSS 706, controller 708, and optical communications network device 710. As further shown in FIG. 7, WSS 706 may include ASIC 706-2 and spectrum control device 706-4. In some non-limiting embodiments, ASIC 706-2 may include a plurality of control lines that are electrically connected with a plurality of liquid crystal cells (e.g., liquid crystal pixels) of spectrum control device 706-4 to control (e.g., control a voltage applied to) each liquid crystal cell of the plurality of liquid crystal cells based on a control signal received by ASIC 706-2.

In some non-limiting embodiments, controller 708 may include microcontroller unit (MCU) 708-2, electrically erasable programmable read-only memory (EEPROM) 708-4, power supply monitor 708-8, temperature sensor 708-6, power converter 708-10, and interface connector 708-12. In some non-limiting embodiments, EEPROM 708-4 may store operational data (e.g., system operating commands) for MCU 708-2. In some non-limiting embodiments, power supply monitor 708-8 and temperature sensor 708-6 may monitor a power supply to MCU 708-2 and a temperature of MCU 708-2, respectively. In some non-limiting embodiments, power converter 708-10 may control electrical energy supplied to MCU 708-2. In some non-limiting embodiments, MCU 708-2 may provide control signals (e.g., electrical control signals) to WSS 706 that cause spectrum control device 706-4 to operate.

In some non-limiting embodiments, interface connector 708-12 may include a connector that allows controller 708 to connect to optical communications network device 710, which may include an OCM, an amplifier, a transceiver, a receiver, a transmitter, and/or the like. Interface connector 708-12 may include components that allow controller 708 to communicate according to an RS232 protocol. In some non-limiting embodiments, interface connector 708-12 may include components for connection to power, an alarm, alarm resets (e.g., a hard alarm reset, a soft alarm reset, etc.), and/or transmission and reception of data.

Figure 8:
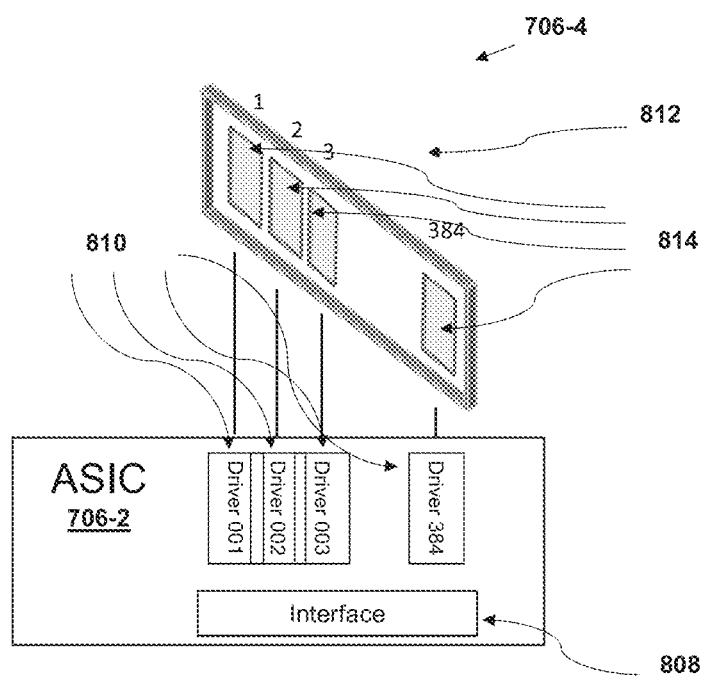
FIG. 8 is a diagram of a non-limiting embodiment of implementation for control of wavelength blocking device according to the presently disclosed subject matter.

Referring now to FIG. 8, FIG. 8 is a diagram of ASIC 706-2 and spectrum control device 706-4. As shown in FIG. 8, ASIC 706-2 may include an interface 808, which may be a Serial Peripheral Interface (SPI) interface and is designed to interface with controller 708 (e.g., with MCU 708-2 of controller 708), and a plurality of drivers 810. As further shown in FIG. 8, spectrum control device 706-4 may include liquid crystal device 812 that has a plurality of liquid crystal cells 814. In some non-limiting embodiments, each driver 810 corresponds to each liquid crystal cell 814, and each corresponding set of driver 810 and liquid crystal cell 814 are associated with a range of wavelengths of light (e.g., an optical transmission band). In some non-limiting embodiments, ASIC 706-2 may control (e.g., operate, drive, etc.) a state of each liquid crystal cell 814 to either reflect or block (e.g., absorb) light of a specified range of wavelengths of light. ASIC 706-2 may control the state of each liquid crystal cell 814 by controlling a voltage that is applied to each liquid crystal cell 814. In some non-limiting embodiments, the number of drivers 810 and the number of liquid crystal cells 814 may be equal. As shown in FIG. 8, there may be 384 drivers 810 and liquid crystal cells 814. In some non-limiting embodiments, a number of drivers 810 and liquid crystal cells 814 may be provided based on a number of communication channels of an optical communications networks.

Figure 9A:
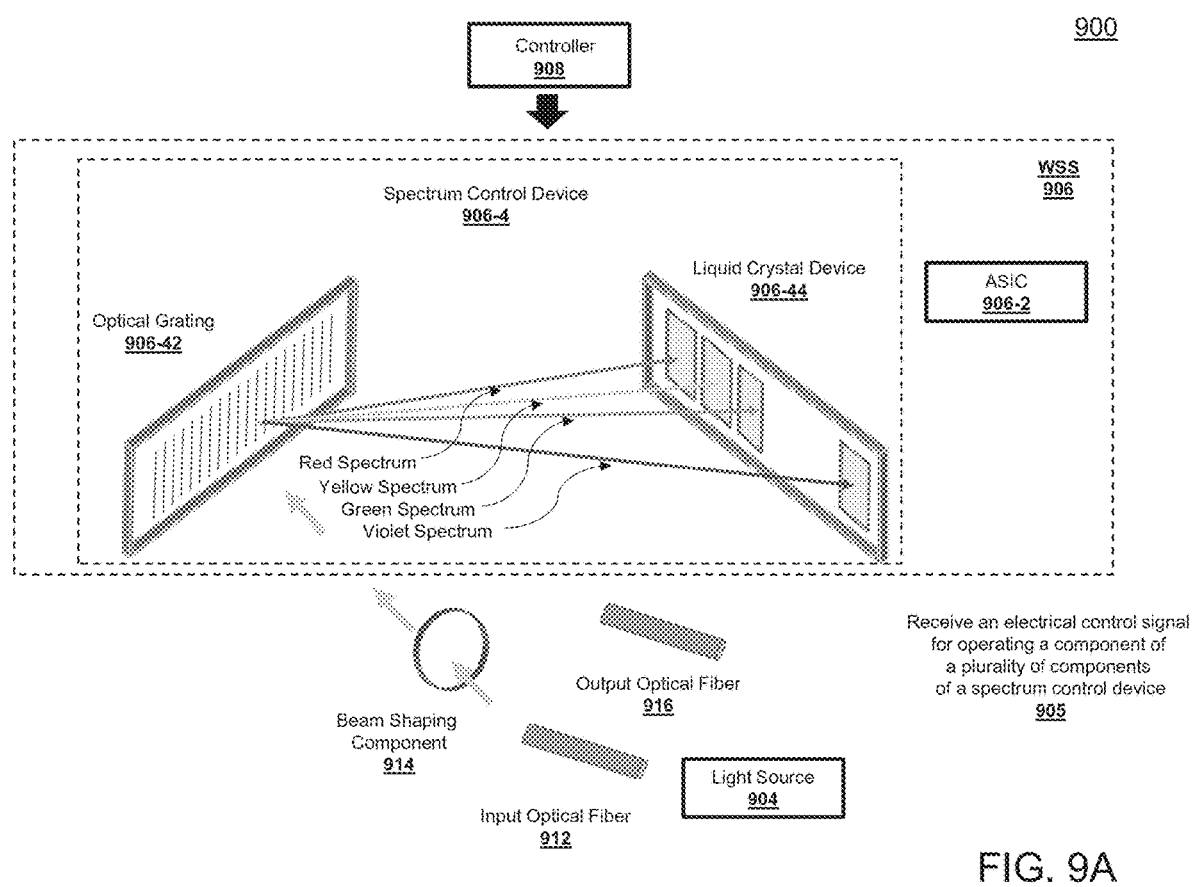
FIGS. 9A-9B are diagrams of another non-limiting embodiment of an implementation of a process for operating a broadband light source device according to the presently disclosed subject matter.
Figure 9B:
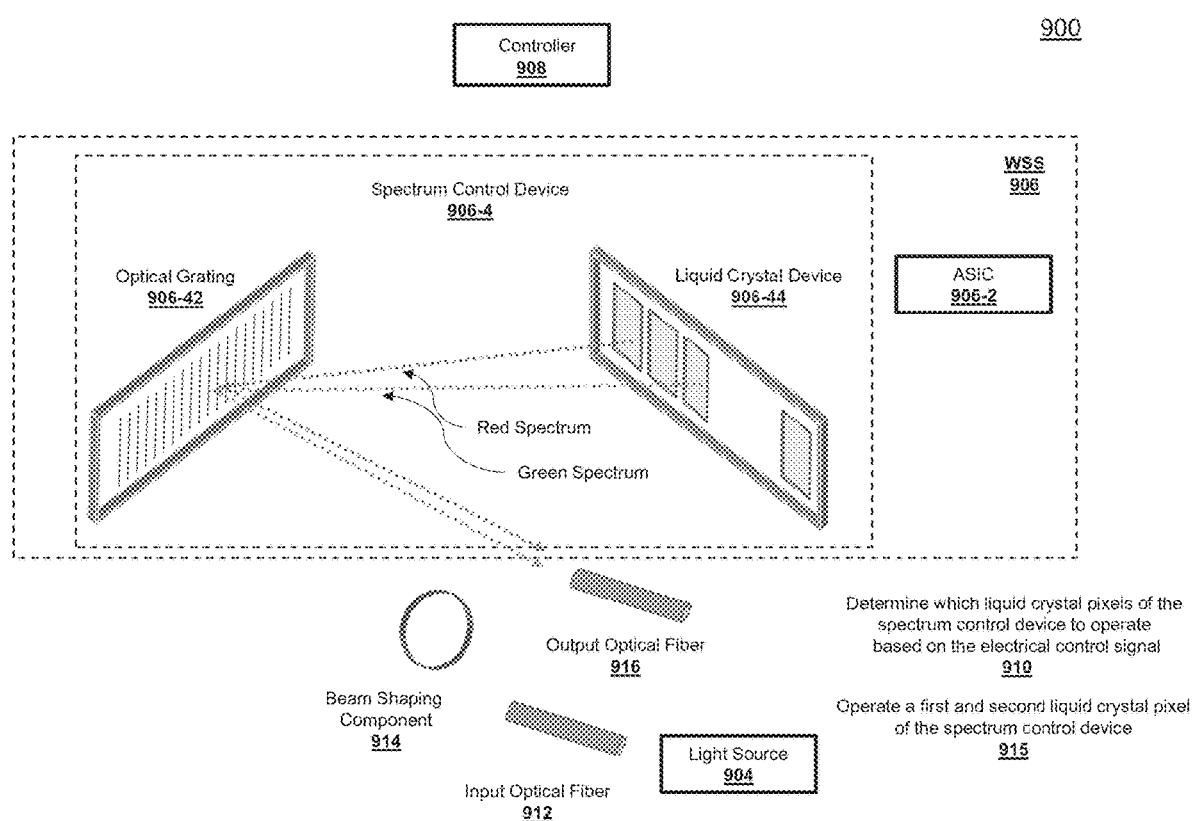

Referring now to FIGS. 9A-9B, FIGS. 9A-9B are diagrams of a non-limiting embodiment of implementation 900 of a process (e.g., process 300) for operating a broadband light source device. As shown in FIGS. 9A-9B, implementation 900 may include components of the broadband light source device, such as light source 904 (e.g., which may be the same as or similar to light source 104 or pump laser 504), WSS 906 (e.g., which may be the same as or similar to WSS 106, or WSS 706), controller 908 (e.g., which may be the same as or similar to host controller 108 or controller 708), input optical fiber 912 (e.g., which may be the same as or similar to input optical fiber 506), beam shaping component 914 (e.g., which may be the same as or similar to input light beam shaping component 508), and output optical fiber 916 (e.g., which may be the same as or similar to output optical fiber 512). In some non-limiting embodiments, as further shown in in FIGS. 9A-9B, WSS 906 may include spectrum control device 906-4 (e.g., which may be the same as or similar to spectrum control device 706-4), which may include optical grating 906-42 and liquid crystal device 906-44 (e.g., which may be the same as or similar to input liquid crystal device 812), and ASIC 906-2 (e.g., which may be the same as or similar to ASIC 706-2).

As illustrated in FIGS. 9A-9B, implementation 900 may include ASIC 906-2 performing the steps of a process (e.g., a process that is the same or similar to process 300). In some non-limiting embodiments or aspects, one or more of the steps of the process may be performed (e.g., completely, partially, etc.) by another device or a group of devices separate from or including ASIC 906-2 (e.g., one or more components of a broadband light source device), such as light source 904, another component of WSS 906, and/or controller 908.

As shown by reference number 905 in FIG. 9A, ASIC 906-2 may receive an electrical control signal for operating a component of a plurality of components of spectrum control device 906-4. In some non-limiting embodiments, ASIC 906-2 may receive the electrical control signal from controller 908. In some non-limiting embodiments, controller 908 may generate the electrical control signal based on receiving an electrical signal from an optical communications network device (e.g., an OCM) that includes data associated with a reduction of power in one or more optical transmission bands (e.g., based on a total loss of power in one or more optical transmission bands, based on a partial loss of power in one or more optical transmission bands, etc.). In some non-limiting embodiments, controller 908 may determine the optical transmission band based on the electrical signal received from the optical communications network device and host controller 108 may generate the electrical control signal, where the electrical control signal includes data associated with the optical transmission band.

In some non-limiting embodiments, controller 908 or WSS 906 (e.g., ASIC 906-2 of WSS 906) may cause light source 904 to activate. For example, controller 908 may cause light source 904 to activate based on receiving an electrical signal from an optical communications network device. In another example, WSS 906 may cause light source 904 to activate based on receiving the electrical control signal from controller 908.

As further shown in FIG. 9A, a light beam produced by light source 904 may be transmitted along input optical fiber 912. The light beam may be shaped by beam shaping component in a desired fashion (e.g., a desired fashion so that the light beam is properly incident on optical grating 906-42). In some non-limiting embodiments, the light beam produced by light source 904 may include a plurality of ranges of wavelengths (e.g., a plurality of optical transmission bands of an optical communications network).

As further shown in FIG. 9A, optical grating 906-42 separates different ranges of wavelengths from the light beam provided along input optical fiber 912. The different ranges of wavelengths are directed to liquid crystal pixels of liquid crystal device 906-44 based on a spectrum assigned to each liquid crystal pixel (e.g., a red spectrum, a yellow spectrum, a green spectrum, and a violet spectrum).

As shown by reference number 910 in FIG. 9B, ASIC 906-2 may determine which liquid crystal pixel of spectrum control device 906-4 to operate. For example, ASIC 906-2 may determine which liquid crystal pixel of spectrum control device 906-4 to operate based on the electrical control signal. In one example, ASIC 906-2 may determine a first range of wavelengths of light (e.g., a red spectrum) and a second range of wavelengths of light based on data included in the electrical control signal and ASIC 906-2 may determine that a first liquid crystal pixel, which corresponds to the first range of wavelengths of light, and a second liquid crystal pixel, which corresponds to the second range of wavelengths of light, of the plurality of liquid crystal pixels of spectrum control device 906-4 are to be operated.

As shown by reference number 915 in FIG. 9B, ASIC 906-2 may operate a first and second liquid crystal pixel of spectrum control device 906-4. For example, ASIC 906-2 may operate a first and second liquid crystal pixel of spectrum control device 906-4. In some non-limiting embodiments, ASIC 906-2 may operate the first and second liquid crystal pixels of spectrum control device 906-4 by controlling the voltage applied to the first and second liquid crystal pixels to cause the first and second liquid crystal pixels to reflect the first range of wavelengths of light and the second range of wavelengths of light (e.g., within 5 ms of receiving the electrical control signal).

As shown in FIG. 9B, the red spectrum and the green spectrum are reflected by the corresponding liquid crystal pixels of liquid crystal device 906-44 to optical grating 906-42 and optical grating 906-42 provides the red spectrum and the green spectrum to output optical fiber 916 so that the red spectrum and the green spectrum can be provided as an output from the broadband light source device.

Although the disclosed subject matter has been described in detail for the purpose of illustration based on what is currently considered to be the most practical and preferred embodiments, it is to be understood that such detail is solely for that purpose and that the disclosed subject matter is not limited to the disclosed embodiments, but, on the contrary, is intended to cover modifications and equivalent arrangements that are within the spirit and scope of the appended claims. For example, it is to be understood that the presently disclosed subject matter contemplates that, to the extent possible, one or more features of any embodiment can be combined with one or more features of any other embodiment.

What is claimed is:

1. A broadband light source device, comprising:
at least one processor programmed or configured to:
receive an electrical control signal for operating a component of a plurality of components of a spectrum control device of the broadband light source device, wherein, when receiving the electrical control signal, the at least one processor is programmed or configured to:
receive the electrical control signal based on a presence of a reduction of power in an optical transmission band of a plurality of optical transmission bands of an optical communications network, wherein the electrical control signal comprises identification data associated with an optical transmission band of the optical communications network that is experiencing a reduction of power, and wherein the identification data corresponds to the component of the plurality of components of the spectrum control device;
determine which component of the plurality of components of the spectrum control device to operate based on the electrical control signal, wherein, when determining which component of the plurality of components of the spectrum control device to operate, the at least one processor is programmed or configured to:
determine a first range of wavelengths of light based on the identification data included in the electrical control signal; and determine that a first component, which corresponds to the first range of wavelengths of light, of the plurality of components of the spectrum control device is to be operated; and operate the first component of the plurality of components of the spectrum control device based on determining to operate the first component.

2. The broadband light source device of claim 1, wherein the spectrum control device comprises:
a liquid crystal device,
a microelectromechanical systems (MEMS) device,
a digital light processing (DLP) device,
a liquid crystal on silicon (LCoS) device, or
any combination thereof.

3. The broadband light source device of claim 1, further comprising:
a host controller; and
a laser light source; and
wherein the at least one processor is further programmed or configured to:
activate the laser light source based on a signal from the host controller.

4. The broadband light source device of claim 1, wherein each component of the plurality of components of the spectrum control device comprises a liquid crystal pixel of a liquid crystal device, and wherein, when operating the first component of the plurality of components of the spectrum control device, the at least one processor is programmed or configured to:
control a voltage applied to a first liquid crystal pixel within 5 ms of receiving the electrical control signal.

5. The broadband light source device of claim 4, wherein, when controlling the voltage applied to a first liquid crystal pixel within 5 ms of receiving the electrical control signal, the at least one processor is programmed or configured to:
control the voltage applied to a first liquid crystal pixel to cause the first liquid crystal pixel to reflect a first range of wavelengths of light within 5 ms of receiving the electrical control signal.

6. A method for operating a broadband light source device, comprising:
receiving, with at least one processor, an electrical control signal for operating a component of a plurality of components of a spectrum control device of the broadband light source device, wherein receiving the electrical control signal comprises:
receiving the electrical control signal based on a presence of a reduction of power in an optical transmission band of a plurality of optical transmission bands of an optical communications network, wherein the electrical control signal comprises identification data associated with an optical transmission band of the optical communications network that is experiencing a reduction of power, and wherein the identification data corresponds to the component of the plurality of components of the spectrum control device;
determining, with at least one processor, which component of the plurality of components of the spectrum control device to operate based on the electrical control signal, wherein determining which component of the plurality of components of the spectrum control device to operate comprises:
determining a first range of wavelengths of light based on the identification data included in the electrical control signal; and
determining that a first component, which corresponds to the first range of wavelengths of light, of the plurality of components of the spectrum control device is to be operated; and operating, with at least one processor, the first component of the plurality of components of the spectrum control device based on determining to operate the first component.

7. The method of claim 6, further comprising:
activating a laser light source based on signal from a host controller.

8. The method of claim 6, wherein each component of the plurality of components of the spectrum control device comprises a liquid crystal pixel of a liquid crystal device, and wherein operating the first component of the plurality of components of the spectrum control device comprises:
controlling a voltage applied to a first liquid crystal pixel within 5 ms of receiving the electrical control signal.

9. The method of claim 8, wherein controlling the voltage applied to a first liquid crystal pixel within 5 ms of receiving the electrical control signal comprises:
controlling the voltage applied to a first liquid crystal pixel to cause the first liquid crystal pixel to reflect a first range of wavelengths of light within 5 ms of receiving the electrical control signal.

10. The method of claim 9, wherein receiving the electrical control signal comprises:
receiving the electrical based on an instruction received from an optical channel monitor (OCM) to operate the broadband light source device.

11. A computer program product for operating a broadband light source device comprising at least one non-transitory computer-readable medium including one or more instructions that, when executed by at least one processor, cause the at least one processor to:
receive an electrical control signal for operating a component of a plurality of components of a spectrum control device of the broadband light source device, wherein, the one or more instructions that cause the at least one processor to receive the electrical control signal, cause the at least one processor to:
receive the electrical control signal based on a presence of a reduction of power in an optical transmission band of a plurality of optical transmission bands of an optical communications network, wherein the electrical control signal comprises identification data associated with an optical transmission band of the optical communications network that is experiencing a reduction of power, and wherein the identification data corresponds to the component of a plurality of components of the spectrum control device;
determine which component of the plurality of components of the spectrum control device to operate based on the electrical control signal, wherein, the one or more instructions that cause the at least one processor to determine which component of the plurality of components of the spectrum control device to operate, cause the at least one processor to:
determine a first range of wavelengths of light based on the identification data included in the electrical control signal; and
determine that a first component, which corresponds to the first range of wavelengths of light, of the plurality of components of the spectrum control device is to be operated; and
operate the first component of the plurality of components of the spectrum control device based on determining to operate the first component.

12. The computer program product of claim 11, wherein each component of the plurality of components of the spectrum control device comprises a liquid crystal pixel of a liquid crystal device, and wherein, the one or more instructions that cause the at least one processor to operate the first component of the plurality of components of the spectrum control device, cause the at least one processor to:
   control a voltage applied to a first liquid crystal pixel within 5 ms of receiving the electrical control signal.

13. The computer program product of claim 12, wherein, the one or more instructions that cause the at least one processor to control the voltage applied to the first liquid crystal pixel within 5 ms of receiving the electrical control signal, cause the at least one processor to:
   control the voltage applied to a first liquid crystal pixel to cause the first liquid crystal pixel to reflect a first range of wavelengths of light within 5 ms of receiving the electrical control signal.

14. The computer program product of claim 11, wherein the one or more instructions further cause the at least one processor to:
   activate a laser light source.

\* \* \* \* \*